United States Patent [19]

Moro et al.

[11] Patent Number: 5,315,889

[45] Date of Patent: May 31, 1994

[54] IRIS DRIVE MECHANISM

[75] Inventors: Shuuji Moro; Kanehiro Tada; Yasuo Nishida, all of Tokyo; Eiji Ohshima, Kanagawa, all of Japan

[73] Assignee: Sony Corporation, Japan

[21] Appl. No.: 900,276

[22] Filed: Jun. 18, 1992

[30] Foreign Application Priority Data

Jun. 28, 1991 [JP] Japan .................................. 3-159087

[51] Int. Cl.⁵ .............................................. F16H 21/44
[52] U.S. Cl. ...................................... 74/105; 74/106; 354/247
[58] Field of Search ............... 74/99 R, 101, 102, 105, 74/106; 354/245, 246, 247, 248, 270, 271.1, 272, 274

[56] References Cited

U.S. PATENT DOCUMENTS

| | | | |
|---|---|---|---|
| 2,859,554 | 11/1958 | Walss | 74/99 R X |
| 3,095,750 | 7/1963 | Mahn | 74/99 R X |
| 3,390,584 | 7/1968 | Carroll | 74/99 R |
| 3,995,295 | 11/1976 | Douglas | 354/247 X |
| 4,316,661 | 2/1982 | Saito | 354/246 X |
| 4,505,563 | 3/1985 | Wong et al. | 354/247 X |
| 4,622,798 | 11/1986 | Oki | 74/106 X |
| 4,797,700 | 1/1989 | Tsuji et al. | 354/271.1 |
| 4,884,091 | 11/1989 | Nakagomi | 354/271.1 |

FOREIGN PATENT DOCUMENTS 3-144546  6/1991  Japan .

OTHER PUBLICATIONS (Canon) Patent Abstracts of Japan, unexamined applications, field P, vol. 12 No. 226, Jun. 28, 1988; The Patent Office Japanese Government p. 59 P 722.

Primary Examiner—Allan D. Herrmann
Assistant Examiner—David W. Laub
Attorney, Agent, or Firm—Ronald P. Kananen

[57] ABSTRACT

An iris drive mechanism has two slidable diaphragms which are operatively connected with a motor through a lever arrangement which, for a given motor output shaft rotational speed moves the diaphragms slowly at their extreme positions wherein the aperture is small and large respectively, and more quickly at an intermediate stage. The slower movement when the aperture is small improves the F number resolution.

3 Claims, 3 Drawing Sheets

IRIS DRIVE MECHANISM

BACKGROUND OF THE INVENTION

1. Field of the Invention:

The present invention relates to an iris drive mechanism which is suitable for incorporation into a lens block.

2. Description of the Prior Art:

In an iris which enables exposure to be adjusted, two diaphragms are operated by a motor or so called ideal gyrator (IG) meter and the displacement of these diaphragms is substantially proportional to the rotational angle of a motor rotation.

Accordingly, even though the aperture is small and the rotational angle of the motor or IG meter (viz, the motor) is small, the diaphragms are displaced through the same distances as those when the aperture is large. This of course induces a considerable change in the F-number.

As a consequence, resolution of the F-number when the aperture is small is reduced and an automatic exposure (AE) control performance is accordingly deteriorated.

OBJECTS AND SUMMARY OF THE INVENTION

Therefore, it is an object of the present invention to provide an improved iris drive mechanism in which the aforesaid shortcomings and disadvantages which are encountered with the prior art are eliminated.

More specifically, it is an object of the present invention to provide an iris drive mechanism in which the number resolution is high even when the apertures are small.

Another object of the present invention is to provide an iris drive mechanism in which an automatic exposure (AE) control performance is improved.

Still another object of the present invention is to provide an iris drive mechanism in which lens spacing can be effectively utilized even in miniaturized lenses.

An aspect of the present invention resides in, an iris drive mechanism in which two diaphragms are opened and/or closed by a first lever rotated by a motor such as a so called ideal gyrator (IG) meter, and wherein a second lever in which an engagement hole with which an output shaft of the motor, is engaged, is formed and an engagement pin which is engaged in an oblong hole formed in the first lever, and a rotary shaft on which the first lever is rotatably supported. With this arrangement, the first lever is rotated through the second lever and the motor in a manner wherein when an aperture is small, the resolution of the F number can be increased, and therefore enhance the AE control performance.

BRIEF DESCRIPTION OF THE DRAWINGS

Other objects, features and advantages of the present invention will become more clearly appreciated from the following detailed description of an illustrative embodiment thereof, taken in conjunction with the appended drawings, in which.

DETAILED DESCRIPTION OF THE PREFERRED EMBODIMENT

An iris drive mechanism according to a preferred embodiment of the present invention will hereinafter be described with reference to the drawings.

Figure 1:
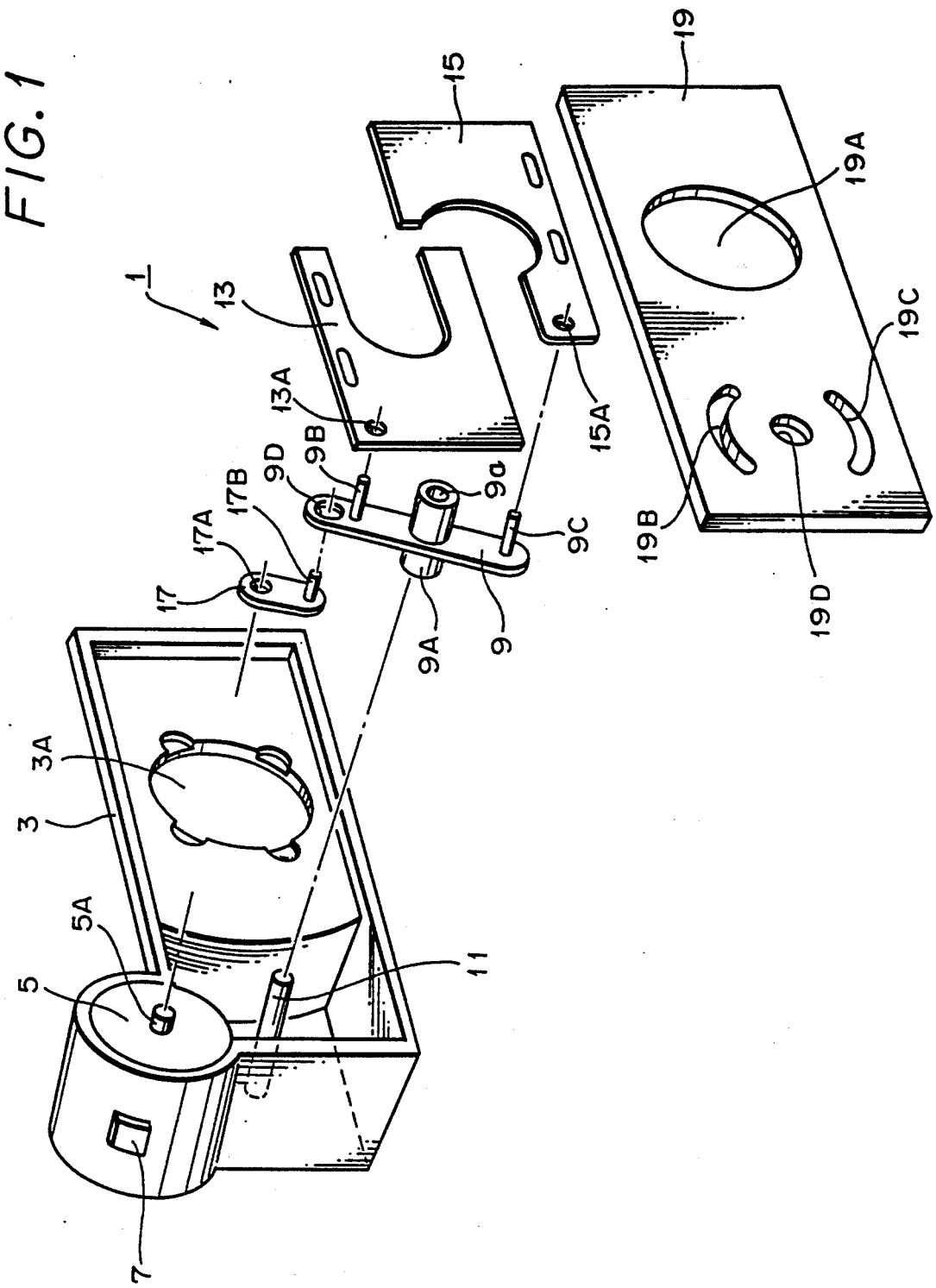
FIG. 1 is an exploded perspective view illustrating an embodiment of an iris drive mechanism according to the present invention.

FIG. 1 shows an overall arrangement of an iris drive mechanism 1 according to the present invention.

As shown in FIG. 1, the iris drive mechanism 1 comprises a frame 3 through which an aperture portion 3A for provide an optical path is formed and an IG meter (viz, motor) 5 which is secured to the frame 3. A Hall element 7 is mounted on the IG meter 5. The Hall element is used to detect the amount of motor operation and therefore the opening and/or closing amount of the iris.

The frame 3 has a support shaft 11 on which a first lever 9 is rotatably supported. A first lever 9 is formed with a hollow cylindrical portion 9A through which the support shaft 11 is disposed.

Figure 2:
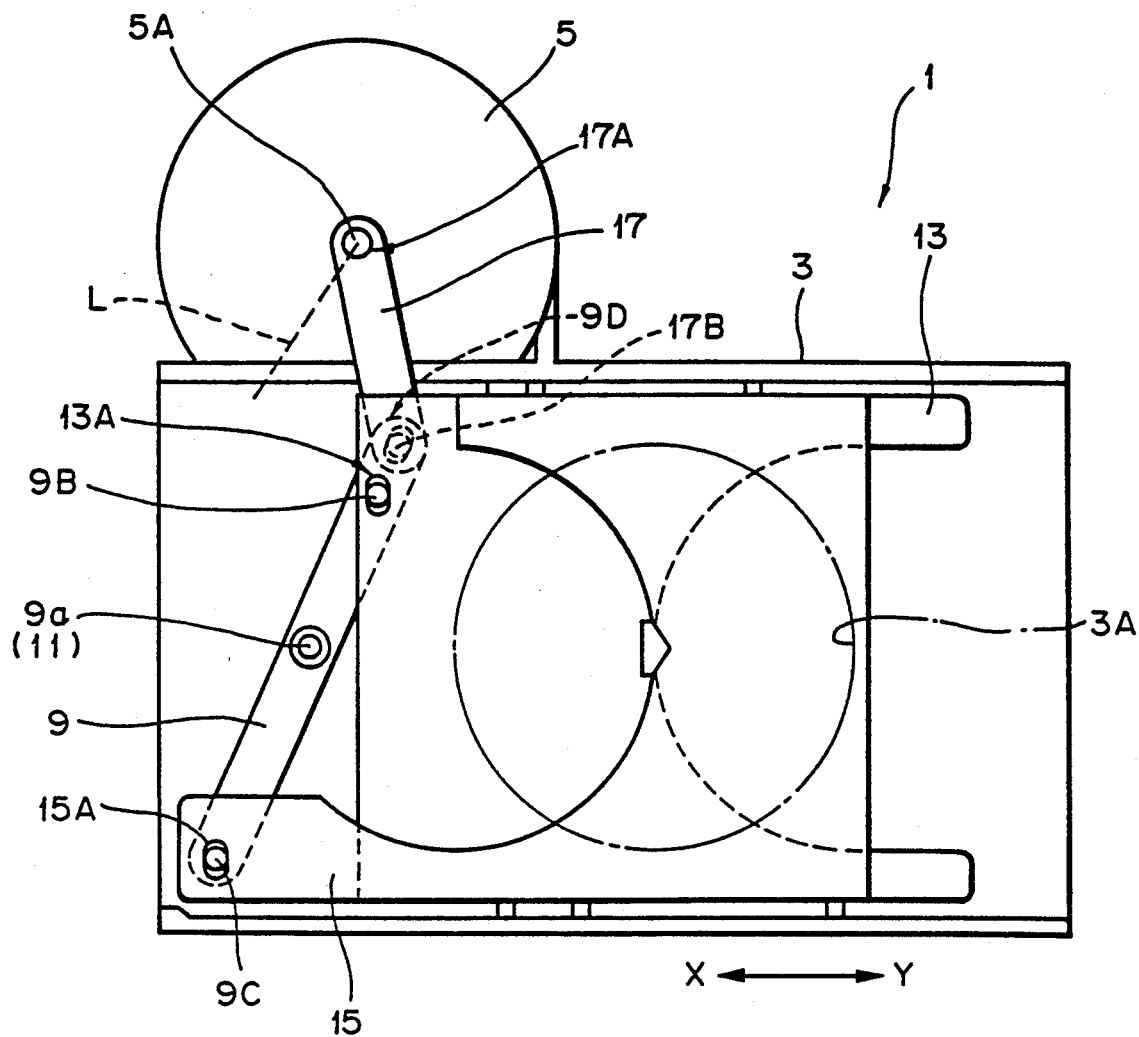
FIG. 2 is a schematic diagram depicting the operation of the iris drive mechanism according to the present invention.

As will be understood from FIG. 2, the first lever 9 formed of an elongate plate, having engagement pins 9B, 9C. These pins 9B, 9C are respectively engaged in oblong holes 13A, 15A formed in diaphragms 13 and 15 which open and/or close the aperture portion 3A. The diaphragm are operatively connected to the first lever 9 on either side of the cylindrical portion 9A.

An oblong hole 9D is formed through the first lever 9 at its end portion proximate the engagement pin 9B. A second elongate flat lever 17 is formed with an engagement pin 17B, which engages in the oblong hole 9D.

The second lever 17 also is formed with a through-hole 17A into which an output shaft 5A of the IG meter 5 is force fitted.

A frame 19, which serves as a cover member, is attached to the frame 3. The frame 19 has formed therethrough a through-hole 19D to which a base side projection portion 9A of the cylindrical portion 9A, is engaged. The frame 19 is also formed with arcuate openings 19B, 19C in which the engagement pins 9B, 9C are received in a manner which permits some rotation about the rotary shaft 11. The frame 19 additionally includes an aperture portion 19A which corresponds to the aperture portion 3A.

Figure 3:
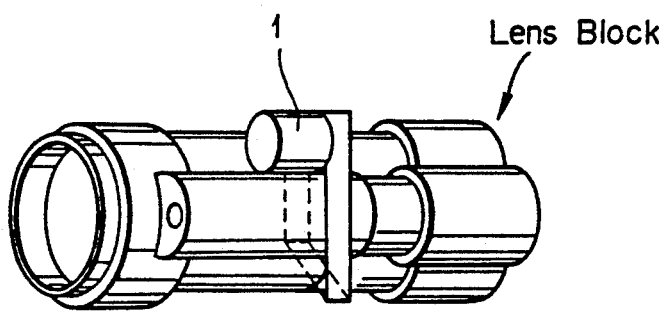
FIG. 3 is a schematic diagram showing the iris drive mechanism incorporated into a lens block.

The iris drive mechanism 1 is assembled into a lens block at a predetermined position in the manner illustrated in FIG. 3.

According to the above-mentioned arrangement, as shown in FIG. 2, when the IG meter 5 is driven, the second lever 17 is rotated and the rotational operation of the second lever 17 is transmitted through the engagement pin 17B and the oblong hole 9D to the first lever 9.

Accordingly, the first lever 9 is rotated about the rotary shaft 11. The rotation of the first lever 9 is transmitted to the one diaphragm 13 through the engagement pin 9B and the oblong hole 13A and also transmitted to the other diaphragm 15 through the engagement pin 9C and the oblong hole 15A. As a result the diaphragms 13, 15 are moved in the directions denoted by arrows X and Y in FIG. 2.

Figure 4:
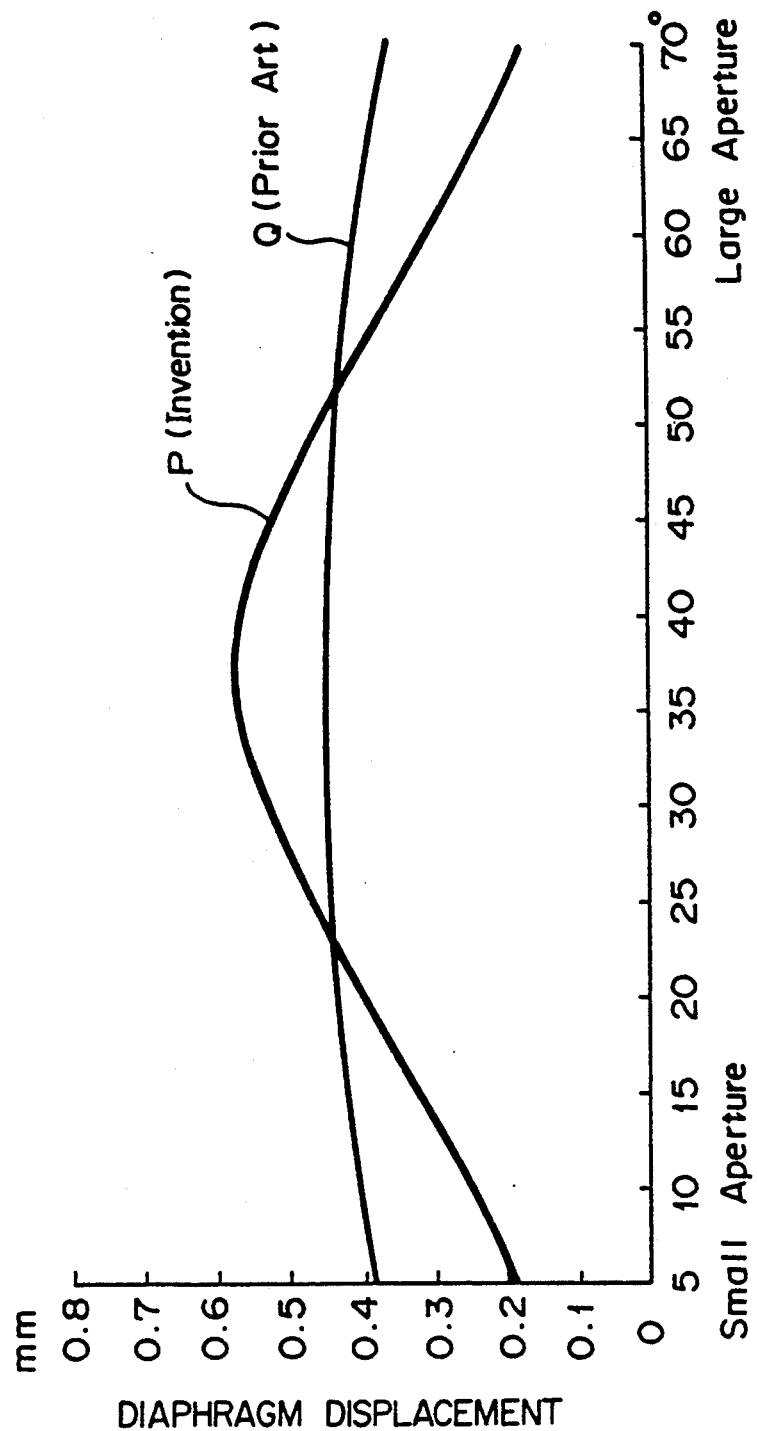
FIG. 4 is a graph showing the correlation between the rotational angle of a lever and the displacement of an associated diaphragm.

Thus, when the second lever 17 is located on the opposite to that denoted by broken line L in FIG. 2, even if the rotational angle of the second lever 17 is constant, the displacement in the diaphragms 13, 15 is small as shown by a curve P of FIG. 4. When the rotational angle of the second lever 17 is 5 degrees on the small aperture side, for example, the moving amount of the diaphragms 13, 15 becomes 0.2 (mm), which is half of the amount (0.4 (mm)) of the conventional iris drive mechanism (see curve Q in FIG. 4).

The iris opening and/or closing amount detected by the Hall element 7 is converted from an angle into an output voltage. In this case, the output voltage increases as the angle is increased. According to this embodiment, even when the displacement of the diaphragms 13, 15 is small, the rotational angle is relatively large and therefore the output voltage from the Hall element 7 also exhibits a relatively large change.

Therefore, the resolution of the iris opening and/or closing amount when the output voltage is A/D converted (viz., converted from analog to digital), can be increased considerably.

As a consequence, the AE control performance in the small aperture region is enhanced and the opening and/or closing operation of the iris can be controlled satisfactorily.

As will be understood from the above-mentioned description, according to the iris drive mechanism of the present invention, the rotary shaft on which the first lever is rotatably supported, is provided separately and the first lever is rotated by the IG meter via the second lever.

Since the first and second levers are linked by means of the oblong holes and engagement pins, the two diaphragms are opened and/or closed by the link mechanism.

Consequently, the displacement of the diaphragms relative to the rotational angle of the IG meter is reduced and therefore, when the F number is relatively small, resolution of the F number is increased particularly at small apertures, and therefore improves the AE control performance.

Furthermore, since the link mechanism is employed, lens space can be effectively utilized even in the case of miniaturized lenses.

Having described the preferred embodiment of the invention with reference to the accompanying drawings, it is to be understood that the invention is not limited to this particular embodiment and that various changes and modifications thereof could be effected by one skilled in the art without departing from the spirit or scope of the invention as defined in the appended claims.

What is claimed is:

1. An iris drive mechanism having first and second diaphragms which are slidable in first and second opposed directions and which control the size of an aperture, comprising:
    a first lever which is pivotally supported on a housing so as to be pivotal about a first axis which passes through essentially the mid-point of said first lever;
    first and second pins which are mounted on said first lever proximate first and second ends of said first lever and at essentially equal distances from the first axis, said first and second pins being received in openings formed in said first and second diaphragms, respectively;
    an elongate opening formed in said first lever at a location outboard of said first pin;
    a motor having a drive shaft;
    a second lever which is rigid with said drive shaft, said second lever having a third pin which is received in said elongate opening, said second lever being relatively short as compared to said first lever;
    said first and second levers cooperating to define means for displacing said first and second diaphragms:
        a) relatively slowly at a first variable rate of displacement through a first initial stage wherein the aperture formed by said first and second diaphragms changes from a minimal opening degree to a first predetermined opening degree,
        b) relatively quickly at a second variable rate of displacement a maximum value of which is at least twice a maximum value of said first variable rate, through a second intermediate stage wherein the aperture formed by said first and second diaphragms opens from the first predetermined opening degree to a second larger predetermined opening degree, and
        c) relatively slowly essentially at said first variable rate of displacement through a third final stage wherein the aperture formed by said first and second diaphragms changes from said second large predetermined opening degree to a maximum opening degree.

2. The iris drive mechanism according to claim 1, wherein a ratio of a rotational amount of said first lever relative to a predetermined rotational amount of said second lever is reduced as a size of the aperture formed by said two diaphragms, is reduced.

3. An iris drive mechanism comprising:
    first and second diaphragms which are slidably arranged with respect to one another and movable between:
    (a) a first maximally separated state wherein a minimum amount of overlap between said first and second diaphragms occurs, and
    (b) a second minimally separated state wherein a maximum amount of overlap between said diaphragms occurs;
        means which includes (a) a motor having an output shaft, and (b) first and second operatively interconnected levers, said first and second operatively interconnected levers operatively interconnecting said first and second diaphragms with the output shaft of said motor means for:
    selectively moving said first and second diaphragms between said first and second states, and, for a given amount of motor output shaft rotation, displacing said first and second diaphragms so that the amount of displacement of said diaphragms continuously varies as said first and second diaphragms move between said first and second states and so that when said diaphragms are essentially mid-way between said first and second states, the amount of displacement is approximately double that when said first and second diaphragms closely approach said first and second states.

* * * * *